United States Patent [19]
Phillips et al.

[11] Patent Number: 5,579,652
[45] Date of Patent: Dec. 3, 1996

[54] GENERATOR-ABSORBER-HEAT EXCHANGE HEAT TRANSFER APPARATUS AND METHOD AND USE THEREOF IN A HEAT PUMP

[75] Inventors: Benjamin A. Phillips, Benton Harbor; Thomas S. Zawacki, St. Joseph, both of Mich.

[73] Assignee: Phillips Engineering Co., St. Joseph, Mich.

[21] Appl. No.: 294,847

[22] Filed: Aug. 26, 1994

Related U.S. Application Data

[63] Continuation-in-part of Ser. No. 76,759, Jun. 15, 1993, Pat. No. 5,367,884.
[51] Int. Cl.$^6$ .................................................... F25B 15/00
[52] U.S. Cl. ................................................ 62/476; 62/487
[58] Field of Search ............................. 62/101, 107, 476, 62/483, 487, 489

[56] References Cited

U.S. PATENT DOCUMENTS

| | | |
|---|---|---|
| 1,180,687 | 4/1916 | Altenkirch et al. . |
| 1,854,223 | 4/1932 | Randel . |

(List continued on next page.)

FOREIGN PATENT DOCUMENTS

| | | |
|---|---|---|
| 272868 | 1/1928 | United Kingdom . |
| 2179137 | 2/1987 | United Kingdom . |

OTHER PUBLICATIONS

PCT International Search Report, dated Mar. 21, 1996, PCT/US95/14019, filed Oct. 27, 1995.
R. J. Modahl and F. C. Haves, "Evaluation of Commerical Advanced Absorption Heat Pump Breadboard," The Trane Company, pp. 117–125, Aug. 1988.
"Development of a Residential Gas Fired Absorption Heat Pump," Chemical Sector Allied Corporation, pp. 2–1 to 2–9, Aug. 1985.

"Phillips Engineering Gas Space Conditioner," pp. 1–10, and summary page, Nov. 5, 1990.
International Journal of Refrigeration, vol. 9, No. 6, Nov. 1986, pp. 326–333, Scharfe et al., "Analysis of Advantages and Limitations of Absorber–Generator Heat Exchange".
B. A. Phillips; "Analyses of Advanced Residential Absorption Heat Pump Cycles"; Proceedings of DOE/ORNL Heat Pump Conference, Washington, D.C.; Dec. 11–13, 1984; pp. 265–287.
B. A. Phillips; "High Efficiency Absorption Cycles for Residential Heating and Cooling"; Intersociety Energy Conversion Eng. Conference, Miami Beach, Florida; Aug. 18–23, 1985; pp. 2.229–2.234.
B. A. Phillips; "A New Future for Absorption?"; ASHRAE Journal; Nov. 1986; pp. 38–42.
B. A. Phillips; "Progress and Problems in Recent Research on Absorption Cycles and Fluids"; U.S.–Israel Workshop, Washington, D.C.; Apr. 23–24, 1987; pp. 89–93.
B. A. Phillips; "Development of an Advanced–Cycle Absorption Heat Pump for Residential Applications"; Proceedings of 2nd DOE/ORNL Heat Pump Conference, Washington, D.C. Apr. 17–20, 1988, pp. 111–116; Document prepared by ORNL for DOE, Aug. 1988.
B. A. Phillips; "High Efficiency Absorption Cycles for Residential Heating and Cooling"; pp. 1–6.
B. A. Phillips; "Development of a Gas Fired Heat Pump with an Improved Absorption Cycle"; ASME Winter Annual Meeting, Nov. 27–Dec. 2, 1988; Chicago, Illinois.

(List continued on next page.)

Primary Examiner—Henry A. Bennett
Assistant Examiner—William C. Doerrler
Attorney, Agent, or Firm—Finnegan, Henderson, Farabow, Garrett & Dunner

[57] ABSTRACT

Numerous embodiments and related methods for generator-absorber heat exchange (GAX) are disclosed, particularly for absorption heat pump systems. Such embodiments and related methods use the working solution of the absorption system for the heat transfer medium. A combination of weak and rich liquor working solution is used as the heat transfer medium.

44 Claims, 7 Drawing Sheets

U.S. PATENT DOCUMENTS

| | | |
|---|---|---|
| 2,392,894 | 1/1946 | Zwickl . |
| 2,979,923 | 4/1961 | Bury . |
| 3,046,756 | 7/1962 | Whitlow et al. . |
| 3,055,194 | 9/1962 | Fink . |
| 3,236,064 | 2/1966 | Whitlow . |
| 3,254,507 | 6/1966 | Whitlow . |
| 3,323,323 | 6/1967 | Phillips . |
| 3,353,369 | 11/1967 | Whitlow . |
| 3,357,203 | 12/1967 | Briggs . |
| 3,357,688 | 12/1967 | Whitlow . |
| 3,367,137 | 2/1968 | Whitlow . |
| 3,367,310 | 2/1968 | Whitlow et al. . |
| 3,390,544 | 7/1968 | Eberz . |
| 3,394,926 | 7/1968 | Whitlow et al. . |
| 3,407,625 | 10/1968 | McDonald . |
| 3,410,104 | 11/1968 | Hopkins . |
| 3,423,951 | 1/1969 | Eisberg . |
| 3,466,893 | 9/1969 | Phillips et al. . |
| 3,481,150 | 12/1969 | English . |
| 3,483,710 | 12/1969 | Bearint . |
| 3,491,551 | 1/1970 | Frohbieter . |
| 3,491,552 | 1/1970 | Roeder, Jr. . |
| 3,509,732 | 5/1970 | Roeder, Jr. . |
| 3,517,522 | 6/1970 | Ozono et al. . |
| 3,527,060 | 9/1970 | Kruggel . |
| 3,527,061 | 9/1970 | Kruggel . |
| 3,566,615 | 3/1971 | Roeder, Jr. . |
| 3,584,975 | 6/1971 | Frohbieter . |
| 3,626,716 | 12/1971 | Leonard, Jr. . |
| 3,638,452 | 2/1972 | Kruggel . |
| 3,639,087 | 2/1972 | Frohbieter . |
| 3,641,784 | 2/1972 | Schlichtig . |
| 3,690,121 | 9/1972 | Patel . |
| 3,693,373 | 9/1972 | Gable . |
| 3,717,007 | 2/1973 | Kuhlenschmidt . |
| 3,750,416 | 8/1973 | Kuhlenschmidt . |
| 3,895,499 | 7/1975 | Hopkins . |
| 3,990,264 | 11/1976 | Patnode et al. . |
| 4,031,712 | 6/1977 | Costello . |
| 4,106,309 | 8/1978 | Phillips . |
| 4,127,009 | 11/1978 | Phillips . |
| 4,127,010 | 11/1978 | Phillips . |
| 4,127,993 | 12/1978 | Phillips . |
| 4,171,619 | 10/1979 | Clark . |
| 4,193,268 | 3/1980 | Phillips . |
| 4,207,751 | 6/1980 | Kampfenkel et al. . |
| 4,209,364 | 6/1980 | Rothschild . |
| 4,237,701 | 12/1980 | Holldorff . |
| 4,246,761 | 1/1981 | Phillips et al. . |
| 4,285,211 | 8/1981 | Clark . |
| 4,299,093 | 11/1981 | Cohen et al. . |
| 4,311,019 | 1/1982 | Rojey et al. . |
| 4,329,851 | 5/1982 | Bourne . |
| 4,337,625 | 7/1982 | Wilkinson . |
| 4,383,416 | 5/1983 | Phillips . |
| 4,410,134 | 10/1983 | Heimbach et al. . |
| 4,445,340 | 5/1984 | Reimann . |
| 4,454,724 | 6/1984 | Erickson . |
| 4,463,570 | 8/1984 | Kantner . |
| 4,467,623 | 8/1984 | Reimann . |
| 4,475,361 | 10/1984 | Alefeld . |
| 4,476,694 | 10/1984 | Kunugi . |
| 4,485,638 | 12/1984 | Reimann . |
| 4,505,133 | 3/1985 | Malewski et al. . |
| 4,526,009 | 7/1985 | van der Sluys et al. . |
| 4,531,374 | 7/1985 | Alefeld . |
| 4,534,180 | 8/1985 | Yasuda et al. . |
| 4,542,628 | 9/1985 | Sarkisian et al. . |
| 4,542,629 | 9/1985 | Biermann . |
| 4,545,217 | 10/1985 | Nakao et al. . |
| 4,546,620 | 10/1985 | Biermann . |
| 4,563,295 | 1/1986 | Erickson . |
| 4,567,736 | 2/1986 | van der Sluys et al. . |
| 4,580,407 | 4/1986 | Aime et al. . |
| 4,593,531 | 6/1986 | Fujimoto . |
| 4,596,122 | 6/1986 | Kantner . |
| 4,646,541 | 3/1987 | Reid, Jr. et al. . |
| 4,665,711 | 5/1987 | Page . |
| 4,691,525 | 9/1987 | Gelderloos . |
| 4,691,532 | 9/1987 | Reid et al. . |
| 4,706,464 | 11/1987 | Kreutmair ................................. 62/101 |
| 4,718,237 | 1/1988 | Sterlini . |
| 4,718,243 | 1/1988 | Buschulte et al. . |
| 4,719,767 | 1/1988 | Reid, Jr. et al. . |
| 4,722,193 | 2/1988 | Purvis et al. . |
| 4,724,679 | 2/1988 | Radermacher . |
| 4,732,008 | 3/1988 | DeVault . |
| 4,735,065 | 4/1988 | Vinz . |
| 4,742,687 | 5/1988 | Reid et al. . |
| 4,742,693 | 5/1988 | Reid, Jr. et al. . |
| 4,763,488 | 8/1988 | Johnston . |
| 4,770,005 | 9/1988 | Alefeld . |
| 4,827,728 | 5/1989 | DeVault et al. . |
| 4,846,240 | 7/1989 | Erickson ................................. 159/24.2 |
| 4,894,998 | 1/1990 | Kaneko et al. . |
| 4,921,515 | 5/1990 | Dao . |
| 4,926,659 | 5/1990 | Christensen et al. . |
| 4,938,028 | 7/1990 | Murray . |
| 4,966,007 | 10/1990 | Osborne . |
| 4,966,014 | 10/1990 | Erickson . |
| 4,967,566 | 11/1990 | Bergmann et al. . |
| 4,972,679 | 11/1990 | Petty et al. . |
| 5,016,444 | 5/1991 | Erickson . |
| 5,024,063 | 6/1991 | Erickson . |
| 5,033,274 | 7/1991 | Erickson . |
| 5,038,574 | 8/1991 | Osborne . |
| 5,050,392 | 9/1991 | Messmer et al. . |
| 5,050,403 | 9/1991 | Maier-Laxhuber . |
| 5,097,676 | 3/1992 | Erickson ................................. 62/476 |
| 5,218,843 | 6/1993 | Dao . |
| 5,271,235 | 12/1993 | Phillips et al. . |
| 5,367,884 | 11/1994 | Phillips et al. . |
| 5,490,393 | 2/1996 | Fuesting et al. . |

OTHER PUBLICATIONS

Columbia Double–Effect Absorption Gas Heat Pump, Market and Technology Prospectus; Columbia Gas System Services Corp., Columbus, Ohio, Feb. 1990.

B. A. Phillips; "Development of a High Efficiency, Gas–Fired, Absorption Heat Pump for Residential and Small–Commercial Applications–Phase I Final Report Analysis of Advanced Cycles and Selection of the Preferred Cycle"; Oak Ridge National Laboratory; Sep., 1990.

Dr. Benjamin A. Phillips; "Absorption Cycles for Air–Cooled Solar Air Conditioning", St. Joseph, Michigan, 1976.

550

GENERATOR-ABSORBER-HEAT EXCHANGE HEAT TRANSFER APPARATUS AND METHOD AND USE THEREOF IN A HEAT PUMP

GOVERNMENT RIGHTS

This invention was made with Government support under contract 15X-17497C awarded by the Department of Energy. The Government has certain rights in this invention.

RELATED APPLICATIONS

The present application is a continuation-in-part of application Ser. No. 08/076,759, filed Jun. 15, 1993, now U.S. Pat. No. 5,367,884.

BACKGROUND OF THE INVENTION

1. Field of the Invention

The present invention relates to refrigeration and heat pump systems and more particularly to an absorption refrigeration cycle of the generator-absorber heat exchange ("GAX") type. The invention is especially adapted for use in a gas-fired, air-to-air, absorption heat pump.

2. Description of Related Art

Absorption refrigeration cycles were developed in the mid 1800's and were used primarily in refrigeration systems. These cycles used a refrigerant/absorbent mixture, the refrigerant vapor being absorbed into a liquid absorbent, thus producing heat, followed by heating the refrigerant/absorbent mixture in a generator to drive off the refrigerant vapor. A condenser, which also produced heat, and an evaporator, which extracted heat, completed the cycle. The heat produced by absorption in the absorber was discarded, along with that from the condenser, to a coolant, generally cooling water.

These early "single stage" absorption cycle systems were inefficient but often preferred to compression systems before the advent of electric motors, because the cost of heat energy to operate them was low and they required much less mechanical energy than compression systems. For most applications, the use of these single stage absorption systems declined with changes in the relative cost of gas and electric energy and improvements in electrically operated compression systems. Even today, however, single stage systems are still applicable in some low pressure lithium bromide commercial air conditioning systems and in refrigeration systems for recreational vehicles and hotel rooms.

In 1913, improved absorption cycles were devised by Altenkirch. One of these cycles was made more efficient than the early single stage cycles by transferring a portion of the heat produced in the absorber to the refrigerant/absorbent fluid pumped to the generator. This transfer of heat reduced the total heat input required to the generator to evaporate the refrigerant from the refrigerant/absorbent mixture. This system has been called the absorber heat exchange (AHE) cycle.

The AHE cycle was used starting in 1965 to produce absorption systems that were efficient enough to be cost effective air-cooled residential air conditioners. However, even in these AHE-cycle systems, a large portion of the heat generated by the absorption process in the absorber was lost. The AHE cycle also was used experimentally in air-to-air gas heat pumps that were advantageous in heating, but were never commercially produced. As energy costs increased, the AHE-cycle air conditioners lost much of their operating cost advantages and today have only a limited market.

In 1913, Altenkirch also devised another absorption cycle that recuperated more of the heat of absorption from the absorber. This cycle, which has come to be known as the generator-absorber heat exchange (GAX) cycle, utilized an additional heat exchange system, whereby higher temperature heat produced by the absorption process in the absorber was transferred via a heat exchange fluid to the low temperature section of the generator. The GAX cycle recovers a large additional amount of heat from the absorber and utilizes higher generator temperatures than the AHE system, and thus is capable of achieving much higher energy efficiencies. The heating efficiency of such GAX systems, relative to the particular fuel used, can be much higher than that of furnaces, boilers, etc.

However, prior art GAX cycle concepts suffered the disadvantage of requiring a separate heat transfer circuit using a separate heat transfer fluid to transfer heat from the absorber to the generator. This heat transfer circuit required hermetic sealing, an expansion chamber, a pump capable of variable flow, and a control system that matched the amount of flow of the heat transfer fluid to the heat to be transferred by the GAX cycle in either the cooling or heating cycle at each particular outdoor temperature. These prior art GAX concepts typically used a heat transfer fluid that remained in the liquid phase and thus only used the sensible heat of the heat transfer liquid.

Electric heat pumps, which operate with a standard condenser-evaporator cycle, have heretofore been utilized for residential and small commercial heating and cooling applications. Electric heat pumps can effectively satisfy the heating and cooling requirements of residential and small commercial buildings in areas having relatively mild climates, such as the southern states of the United States, but these electric heat pumps are not capable of providing, without auxiliary heating equipment, the necessary heating in climates where the temperatures drop below about 30° F. In addition, these electric heat pump systems typically use refrigerants that may be hydrochlorofluorocarbons (HCFC's) or chlorofluorocarbons (CFC's), which are environmentally hazardous.

Thus, the need exists for a generator-absorber heat exchange apparatus and method suitable for use in a residential or small commercial heat pump that efficiently transfers a large portion of heat produced by the absorption process in the absorber to the generator without the use of a costly, possibly failure prone, independent heat transfer circuit.

The instant invention satisfies that need by providing a generator-absorber heat exchange apparatus and method that can use an environmentally safe fluid both as the working fluid and the heat exchange fluid, that efficiently recovers a large proportion of the heat generated by the absorption process in the absorber, that does not require an elaborate system of controls, that advantageously uses both the latent heat and the sensible heat of the working fluid to transfer heat from the absorber to the generator by operating between its vapor and liquid phases, and that, because of size, cost and efficiency, can be used to satisfy residential or small commercial heating and cooling requirements over a wide range of climates, including sufficient heating at temperatures below 0° F.

Additional features and advantages of the invention will be set forth in the drawings and written description that follow, and in part will be apparent from the drawings and written description or may be learned from the practice of the invention. The advantages of the invention will be realized and attained by the generator-absorber heat exchange apparatus, the heat pump incorporating the generator-absorber heat exchange apparatus, and the method for transferring heat between an absorber and generator in a generator-absorber heat exchange apparatus particularly pointed out in the drawings, written description, and claims hereof.

SUMMARY OF THE INVENTION

To achieve these and other advantages, and in accordance with the purpose of the invention as embodied and broadly described herein, the present invention, in one aspect, provides a generator-absorber heat exchange apparatus that includes a generator and an absorber. The absorber has an interior pressure lower than the interior pressure of the generator, and each has high and low temperature regions at opposite ends and a heat transfer region. The temperature ranges of the generator and absorber that define the respective heat transfer regions overlap. A fluid flow pathway is provided for circulation of a weak liquor from the high temperature region of the generator and a rich liquor from a low temperature region of the absorber to and through the high temperature, heat transfer, and low temperature regions of the generator and the absorber.

The improvement to the generator-absorber heat exchange apparatus, in accordance with the invention as embodied and broadly described herein, comprises a heat exchange circuit receiving all or at least a portion of weak liquor from the fluid flow pathway and also receiving a portion of rich liquor from the fluid flow pathway and circulating the portions of the weak and rich liquor through the heat transfer regions of the absorber and the generator, thereby transferring heat from the absorber to the generator.

The present invention, in another aspect, comprises a generator-absorber heat exchange (GAX) apparatus that includes a generator containing a liquor having a concentration gradient extending from rich proximate an upper end to weak proximate a lower end and a temperature gradient extending from low proximate the upper end to high proximate the lower end. A heater is disposed to heat liquor in the generator proximate its lower end.

The GAX apparatus in this aspect of the invention also includes an absorber having a pressure in its interior lower than the interior pressure of the generator and containing a liquor having a concentration gradient extending from weak proximate an upper end to rich proximate a lower end and a temperature gradient extending from high proximate the upper end to low proximate the lower end. The respective generator and absorber temperature gradients overlap, and this overlap defines respective heat transfer region in the generator and absorber.

This GAX apparatus according to the present invention also includes a rich liquor heat exchange conduit having an input end in fluid communication with the absorber proximate the lower end thereof disposed to receive rich liquor from the absorber, a heat exchange element disposed in the absorber heat transfer region to transfer heat from the absorber to the rich liquor and an output end disposed in the generator proximate the upper end thereof to distribute the rich liquor from the lower end of the absorber for passage along the concentration and temperature gradients of the generator. A pump in fluid communication with the rich liquor conduit is also provided for moving fluid through the rich liquor heat exchange conduit from the absorber to the absorber heat exchange element and then to the generator. This GAX apparatus further includes a weak liquor heat exchange conduit having an input end in fluid communication with the generator proximate the lower end thereof disposed to receive liquor from the generator, a heat exchange element disposed in the generator heat transfer region to transfer heat from the weak liquor to the generator, and an output end disposed in the absorber proximate the upper end thereof to distribute weak liquor from the lower end of the generator for passage along the concentration and temperature gradients of the absorber.

The present invention also provides, in another aspect, a heat pump comprising an indoor liquid-air heat exchanger, an outdoor liquid-air heat exchanger, a generator-absorber heat exchange apparatus as described above, and an antifreeze circuit. The antifreeze circuit in accordance with this aspect of the invention is disposed to circulate antifreeze fluid between the indoor and outdoor heat exchangers and the generator-absorber heat exchange apparatus for selectively extracting heat in one of the heat exchangers and transferring heat from the other of the heat exchangers.

In accordance with another aspect of the present invention, a method is provided for transferring heat between an absorber and a generator in a generator-absorber heat exchange apparatus. This heat transfer is accomplished by circulating a portion of a rich liquor and all or at least a portion of a weak liquor through the respective heat transfer regions of the absorber and the generator.

In accordance with another aspect of the invention, a method is provided for transferring heat between a region of low temperature and a region of medium temperature using the generator-absorber heat exchange apparatus of the invention. This method comprises circulating at least a portion of an antifreeze fluid between an indoor heat exchanger and at least one of an absorber heat exchanger, a condenser heat exchanger and a generator heat exchanger, thereby transferring heat via the antifreeze fluid from at least one of the absorber, condenser and generator heat exchangers to the indoor heat exchanger. The method also comprises circulating an antifreeze fluid between an outdoor heat exchanger and an evaporator heat exchanger, thereby transferring heat via the antifreeze fluid from the outdoor heat exchanger to the evaporator heat exchanger.

In accordance with another aspect of the invention, a method is provided for transferring heat between a region of high temperature and a region of medium temperature using the generator-absorber heat exchange apparatus of the invention. This method comprises circulating at least a portion of antifreeze fluid between an outdoor heat exchanger and at least one of an absorber heat exchanger, a condenser heat exchanger and a generator heat exchanger, thereby transferring heat via the antifreeze fluid from at least one of the absorber, condenser and generator heat exchangers to the outdoor heat exchanger. The method also comprises circulating an antifreeze fluid between an indoor heat exchanger and an evaporator heat exchanger, thereby transferring heat via the antifreeze fluid from the indoor heat exchanger to the evaporator heat exchanger.

Although the invention is illustrated as embodied in a gas-fired residential heat pump, the invention as broadly claimed is not so limited and its benefits and advantages apply equally to other heating and refrigeration processes. The above and other advantages and features of this invention will become apparent upon review of the following specification in conjunction with the drawings.

DETAILED DESCRIPTION OF THE PREFERRED EMBODIMENTS

In accordance with the invention, the term "weak liquor" as used herein refers to the liquor in or leaving the high temperature region, i.e., the bottom portion, of the generator. The term "rich liquor" as used herein refers to the liquor in or leaving the low temperature region, i.e., the bottom portion, of the absorber. The terms "weak" and "rich" refer to concentration of the absorbed component(s), i.e., refrigerant, in the total solution. Thus, a weak liquor liquid has less absorbed refrigerant, such as ammonia, and more absorbent, such as water, than an equal amount of a rich liquor liquid. However, a vapor in equilibrium with a liquid will have a much higher concentration of refrigerant than the liquid. For example, at the bottom of the absorber, the vapor entering from the evaporator may have a concentration of refrigerant of, for instance, about 99%, while the rich liquor liquid in equilibrium with this rich liquor vapor may have a concentration of refrigerant of, for example, about 45–48%. Accordingly, the weak liquor vapor at the top of the absorber that is in equilibrium with the weak liquor liquid entering from the generator will have a concentration of refrigerant that is greater than the weak liquor liquid concentration.

As noted above, both the absorbed component(s) and the absorbent component(s) constituting the weak liquor and rich liquor may be in either a vapor or liquid state or a combination of the two. Also, the term "heat pump" as used herein is intended to include any apparatus that transforms heat between low, medium, and high temperature states and is intended to include not only the commonly understood meaning of the term, but also as used herein is intended to include heat transformers as well as more traditional systems such as refrigeration and air conditioning systems.

Figure 1:
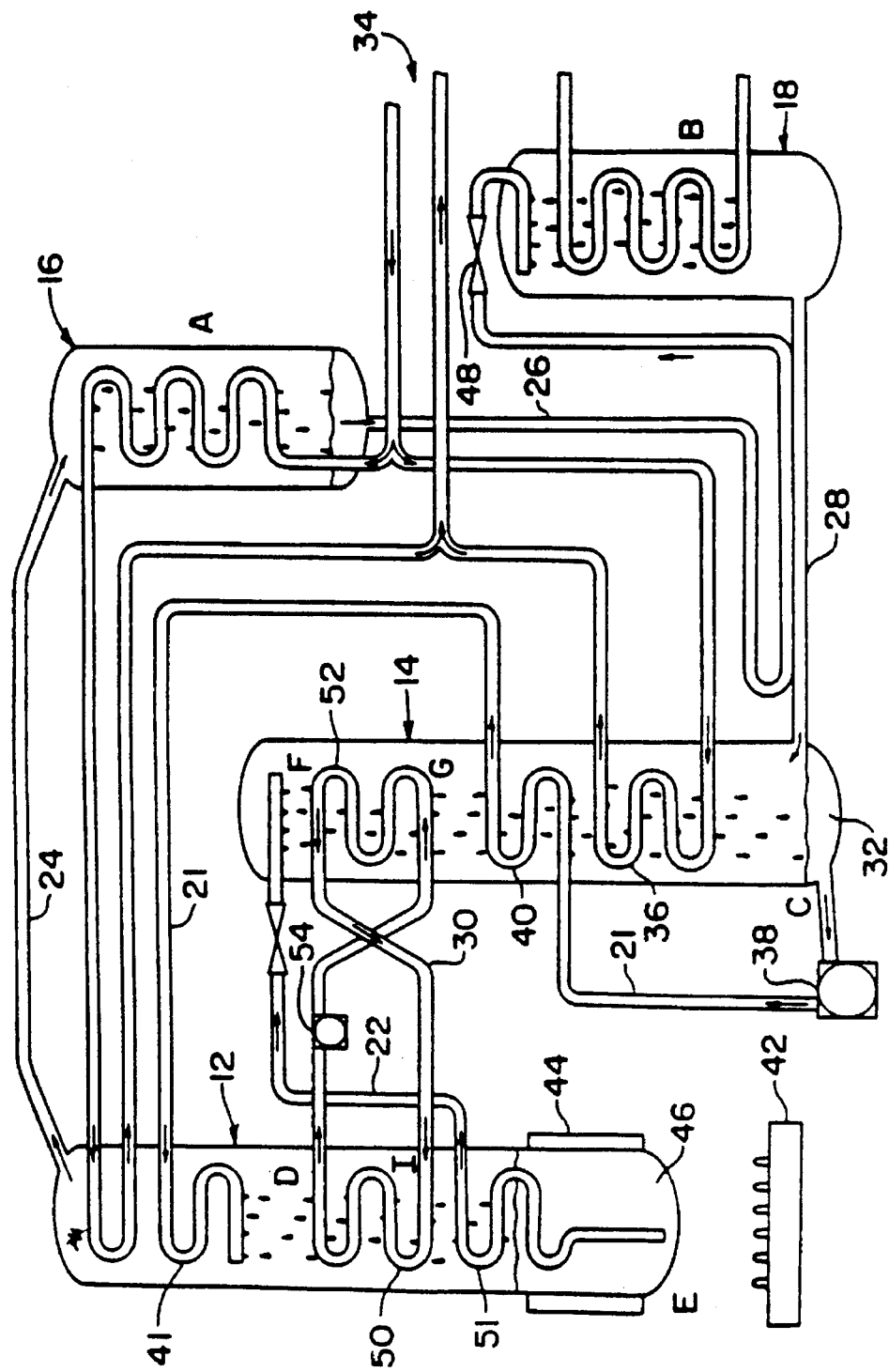
FIG. 1 is a flow diagram illustrating an absorption apparatus using a conventional generator-absorber, heat-exchange (GAX) circuit.

In the known prior art system illustrated in FIG. 1, a generator-absorber heat exchange apparatus 10 operating on the generator-absorber heat exchange (GAX) cycle generally comprises a generator 12, an absorber 14, a condenser 16, an evaporator 18, a solution pump 38, and a refrigerant liquor pathway for circulation of a refrigerant liquor to and through generator 12 and absorber 14. In particular, the refrigerant liquor pathway includes a rich liquor pathway 21 providing fluid communication of rich liquor 32 from a low temperature region C of absorber 14 to a low temperature region D of generator 12, and a weak liquor pathway 22 providing fluid communication of weak liquor 46 from a high temperature region E of generator 12 to a high temperature region F of absorber 14. The refrigerant liquor pathway is completed by passage of liquor from weak liquor pathway 22 through high temperature, intermediate temperature and low temperature regions F, G, C of absorber 14 and by passage of liquor from rich liquor pathway 21 through low temperature, intermediate temperature and high temperature regions D, I, E of generator 12. The refrigerant pathway is completed from generator 12 to condenser 16 through conduit 24, from condenser 16 to evaporator 18 through conduit 26, and from evaporator 18 to absorber 14 through conduit 28.

The terms "low temperature region," "intermediate temperature region" and "high temperature region" as used herein are meant to refer to relative temperatures. As depicted in FIG. 1, each region will be defined by a range of temperatures, which in each particular component is relatively higher or lower than the other region. Thus, for example, high temperature region E of generator 12 might have a temperature of around 400° F and low temperature region D of generator 12 might have a temperature of around 200° F. On the other hand, high temperature region F of absorber 14 might have a temperature of around 300° F and low temperature region C of absorber 14 might have a temperature of around 100° F. In each of generator 12 and absorber 14 there is an area of overlapping temperature termed herein the heat transfer region. This heat transfer region is depicted in FIG. 1 as the area between regions D and I of generator 12 and the area between regions G and F of absorber 14.

An absorption generator is, in essence, a distillation column, which has a stripping section and a rectifying section. The stripping section is the lower, hotter section corresponding to the portion between regions D and E, while the rectifier section is the upper, cooler section corresponding to the portion above region D. The dividing point between the stripping and rectifying sections, region D, is the region of the generator that has a temperature corresponding to the boiling point of the rich liquor liquid at the generator pressure.

As depicted in FIG. 1, the vertical temperature gradients of absorber 14 and generator 12 are reversed, i.e., the highest temperature region E of generator 12 is at or near its lower or bottom end, whereas the highest temperature region F of absorber 14 is at or near its upper end. Thus, the orientation of the respective heat transfer regions D-I and G-F is similarly opposite. The temperature range defining heat transfer regions D-I and G-F is within the temperature overlap between the temperature range of generator 12 and the temperature range of absorber 14, e.g., within the range of, for example, about 200° F to about 300° F.

The known apparatus depicted in FIG. 1 includes a heat transfer circuit 30 disposed between heat transfer regions D-I and G-F of generator 12 and absorber 14, which is oriented so as to conduct fluid directly between areas of the heat transfer regions.

During operation of the known system of FIG. 1, a refrigerant fluid, consisting primarily of a refrigerant, such as ammonia, but possibly containing a small amount of absorbent if it is volatile, such as water, exits evaporator 18 mostly as a vapor and passes through conduit 28 to absorber 14 at low temperature region C. This refrigerant vapor rising upward through absorber 14 is absorbed into a countercurrent flow of weak liquor, thus producing a rich liquor 32 that accumulates in the liquid state at low temperature region C of absorber 14. This process takes place at a temperature above that of the surroundings, generating heat, some of which is transferred to air, water, antifreeze or other heat transfer fluid circulating during this process through heat exchanger 36 located in a heat exchange circuit 34.

Rich liquor 32 is transferred along rich liquor pathway 21 by a solution pump 38 to region D of generator 12, where a higher pressure is maintained. A higher pressure is maintained in generator 12 than in absorber 14. For example, the pressure in generator 12 may commonly be around 240–340 psia and the pressure in absorber 14 may be around 15–80 psia. In accordance with the absorber heat exchange (AHE) cycle principle, heat exchanger 40 in rich liquor pathway 21 is used to transfer absorber heat to rich liquor 32. In one alternative, rich liquor 32 is heated in heat exchanger 40 to its boiling point at the pressure of generator 12 and provided as a heat input to region D of generator 12. Alternatively, as shown in FIG. 1, rich liquor 32 is heated in heat exchanger 40 to a temperature below its boiling point and thereafter is heated in heat exchanger 41 in the rectifier section above region D of generator 12. In either alternative, rich liquor 32 is distributed within generator 12 at region D.

Heat source 42 and heat transfer fins 44 cooperate to heat rich liquor 32 as it passes downward through generator 12, thereby driving refrigerant vapor from rich liquor 32 to form weak liquor 46 at high temperature region E of generator 12. Vapor having a concentration of near 100% refrigerant is expelled from generator 12 through refrigerant pathway 24 to condenser 16 where it is condensed and fed via conduit 26 through restriction means 48 to a lower pressure in evaporator 18. Weak liquor 46 in high temperature region E of generator 22 is returned through weak liquor pathway 22 to high temperature region F of absorber 14. The sensible heat of weak liquor 46 is provided as a heat input to generator 12 at heat exchanger 51. Heat may also be transferred in a heat exchanger (not shown) between rich liquor pathway 21 and weak liquor pathway 22.

In the known generator-absorber heat exchange system illustrated in FIG. 1, heat transfer is performed by a GAX heat transfer circuit 30, including, for example, a pair of heat exchange coils 50 and 52 and a pump 54 to circulate heat transfer fluid such as pressurized water. Since the vertical temperature gradients of absorber 14 and generator 12 are reversed, it is necessary to cross-connect the pathways between coils 50 and 52, as illustrated in FIG. 1.

Figure 2:
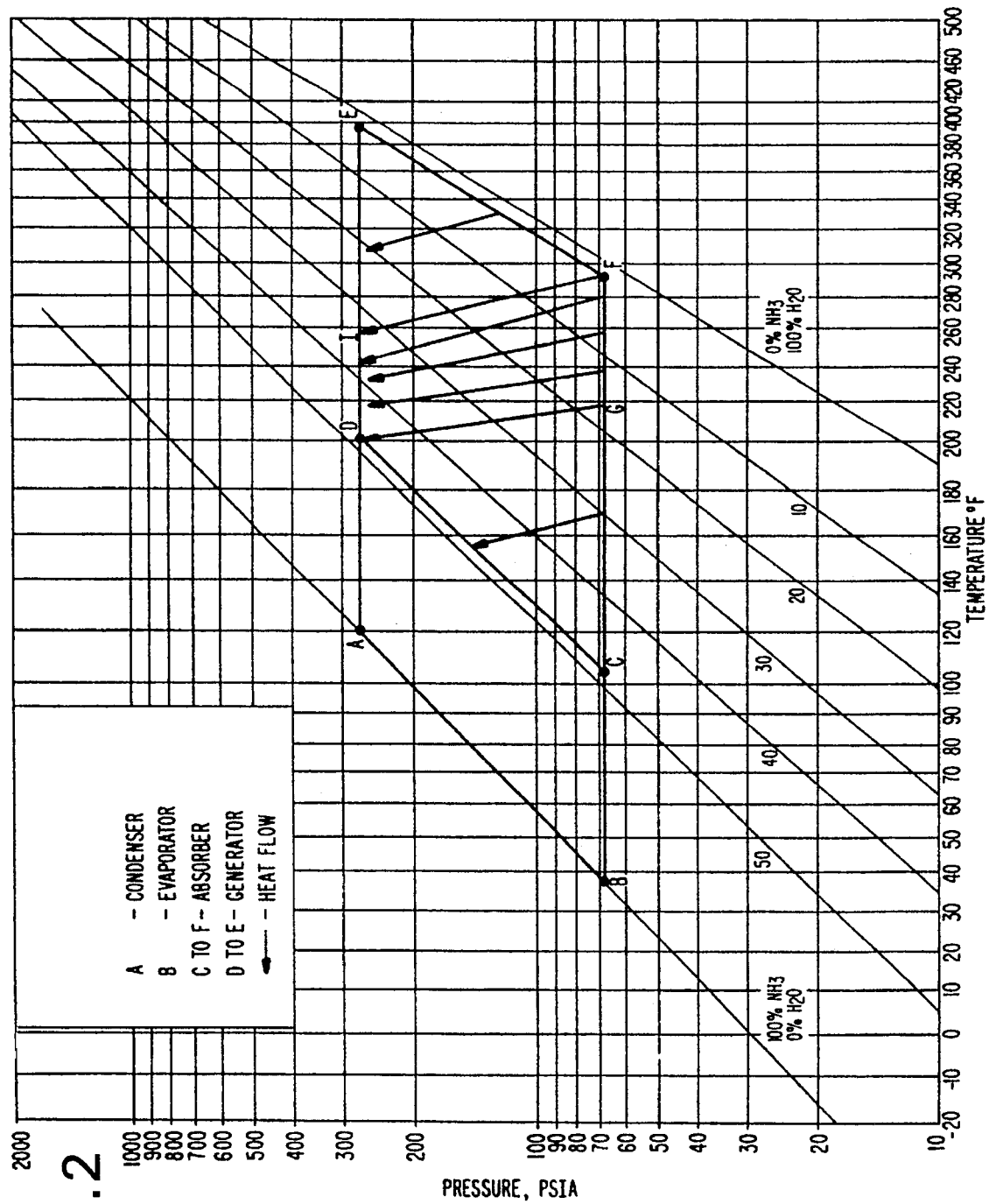
FIG. 2 is a pressure-temperature-composition diagram (P-T-X) of the system in FIG. 1.

The principle of the GAX cycle is illustrated in the pressure-temperature-composition diagram of FIG. 2 in which point D represents the dividing point between the stripping and rectifying sections of generator 12, point E represents the high temperature region of generator 12, point C represents the low temperature region of absorber 14, point F represents the high temperature region of absorber 14, point I represents the region of generator 12 that is at a temperature lower than the temperature of point F in absorber 14 by an amount sufficient to provide the necessary temperature difference for heat transfer between those regions, and point G represents the region of absorber 14 that is at a temperature higher than the temperature of point D in generator 12 by an amount sufficient to provide the necessary temperature difference for heat transfer between those regions. These regions in FIG. 2 correspond to regions D, E, C, F, I and G, respectively, in FIG. 1. Line D-I represents the GAX heat transfer region of generator 12 and line G-F represents the GAX heat transfer region of absorber 14. Points A and B represent the condenser 16 and evaporator 18, respectively. The line from C to D represents rich liquor pathway 21 and the line from E to F represents weak liquor pathway 22. The arrows in FIG. 2 extending from the G-F line to the D-I line indicate heat transfer from the heat transfer region of absorber 14 to the heat transfer region of generator 12.

The heat to be transferred from absorber 14 to generator 12 is available over a temperature range in absorber 14 and should be transferred to a temperature range in generator 12 that is cooler only by the temperature differential required to transfer the heat. To do this most efficiently, the heat from the hottest segment of heat transfer region F of absorber 14 should be transferred to the hottest segment of heat transfer region I in generator 12, and similarly for each of the progressively cooler segments of heat transfer regions of absorber 14 and generator 12. This means that the heat transfer fluid temperature range must fit between the heat transfer region temperature ranges of generator 12 and absorber 14, and each of the segments.

In accordance with the present invention, as embodied and broadly described herein, a heat exchange circuit is provided in a generator-absorber heat exchange apparatus that includes a generator and an absorber. The absorber has an interior pressure lower than the pressure of the generator interior and each of the generator and absorber has vertically opposed high and low temperature regions and a heat transfer region. The generator and absorber temperature ranges overlap, and this overlap defines the respective heat transfer regions of the generator and absorber. The generator-absorber heat exchange apparatus further includes a fluid flow pathway for circulation of a liquor having rich and weak concentrations of refrigerant through the high temperature, heat transfer, and low temperature regions of the generator and absorber.

The present invention provides embodiments and methods for performing GAX heat transfer in a generator-absorber heat exchange apparatus using both latent and sensible heat of the refrigerant/absorbent working fluid of the system. The apparatus of the invention includes a heat exchange circuit that is disposed to receive a portion of the weak liquor from the generator and a portion of rich liquor from the absorber and to circulate these liquors through the heat transfer regions of the absorber and the generator to transfer heat from the absorber to the generator. The term "heat transfer region" as used herein is intended to include not only regions in the interior of the generator and absorber having overlapping temperatures, but also those regions adjacent to or in heat transfer contact with the interior of the generator and absorber having overlapping temperatures. The transfer should preferably be provided over the full overlap temperature range.

In accordance with the invention, as embodied and broadly described herein, the heat exchange circuit comprises a weak liquor heat exchange conduit including a heat exchange element disposed in the heat transfer region of the generator, this conduit receiving all or at least a portion of weak liquor from the fluid flow pathway proximate the lower end of the generator, conducting the portion of weak liquor to the heat exchange element disposed in the generator heat transfer region where heat is transferred from the weak liquor to the generator, and then conducting the weak liquor from the generator heat exchange element to the absorber interior. The heat exchange circuit further comprises a rich liquor heat exchange conduit including a heat exchange element disposed in the heat transfer region of the absorber, this conduit receiving a portion of rich liquor from the fluid flow pathway proximate the lower end of the absorber, conducting the portion of rich liquor to the heat exchange element disposed in the absorber heat transfer region where heat is transferred from the absorber to the rich liquor, and then conducting the rich liquor portion from the absorber heat exchange element to the generator interior. The term "heat exchange element" as used in accordance with the invention refers to any apparatus or device that is capable of providing for the exchange of heat between fluids, such as a heat exchange coil.

In accordance with the invention, as embodied and broadly described herein, the motive force for circulating the liquor in the heat exchange circuit may alternatively be provided by a pump, the pressure differential between the generator and absorber, or a combination thereof. The heat exchange circuit also includes input ends in fluid communication with the fluid flow pathway for withdrawing refrigerant liquor from the pathway and output ends for distributing the liquor within the generator or absorber. The input ends may be in fluid communication with the fluid flow pathway where the liquor is a liquid, a vapor, or a combination thereof.

In accordance with the invention, as embodied and broadly described herein, the output ends of the heat exchange circuit are provided to distribute the portions of the liquor circulated between heat transfer regions into either the generator or the absorber interior. These output ends may be any device capable of distributing a liquid or a vapor/liquid mixture, such as a distributor, and is preferably located at a region of the generator or absorber where the temperature of the liquor exiting the distributor and the temperature of the interior of the generator or absorber immediately adjacent the distributor are essentially equal. Depending on the pressure of the liquor provided to the distributor, a pressure regulating device may be provided upstream of the distributor to regulate flow and/or reduce the pressure of the liquor flowing to the distributor.

In all of the embodiments of the invention described herein and variations thereof, it is preferable to orient the flow of liquid, vapor, or liquid and vapor mixture vertically upwards when passing such through a heat exchange coil in either the generator or absorber. This flow orientation best matches the temperature gradients in the absorber where the liquor is being heated and in the generator in which the liquor gives up its heat. This orientation further provides the best counterflow temperature differentials between the rising coil contents and falling liquid.

In accordance with the embodiments of the GAX heat transfer apparatus described herein, the heat exchange coils can be located in the interior of the generator and absorber. Alternatively, in accordance with the invention, the heat exchange coils can be located at the exterior of the generator and absorber adjacent to and/or in heat transfer contact with the region in which heat transfer is desired. The term "heat transfer region" as used herein is meant to include the interior of the generator or absorber, as well as regions outside the generator or absorber adjacent to and/or in heat transfer contact with the region in which heat transfer is desired.

Figure 3:
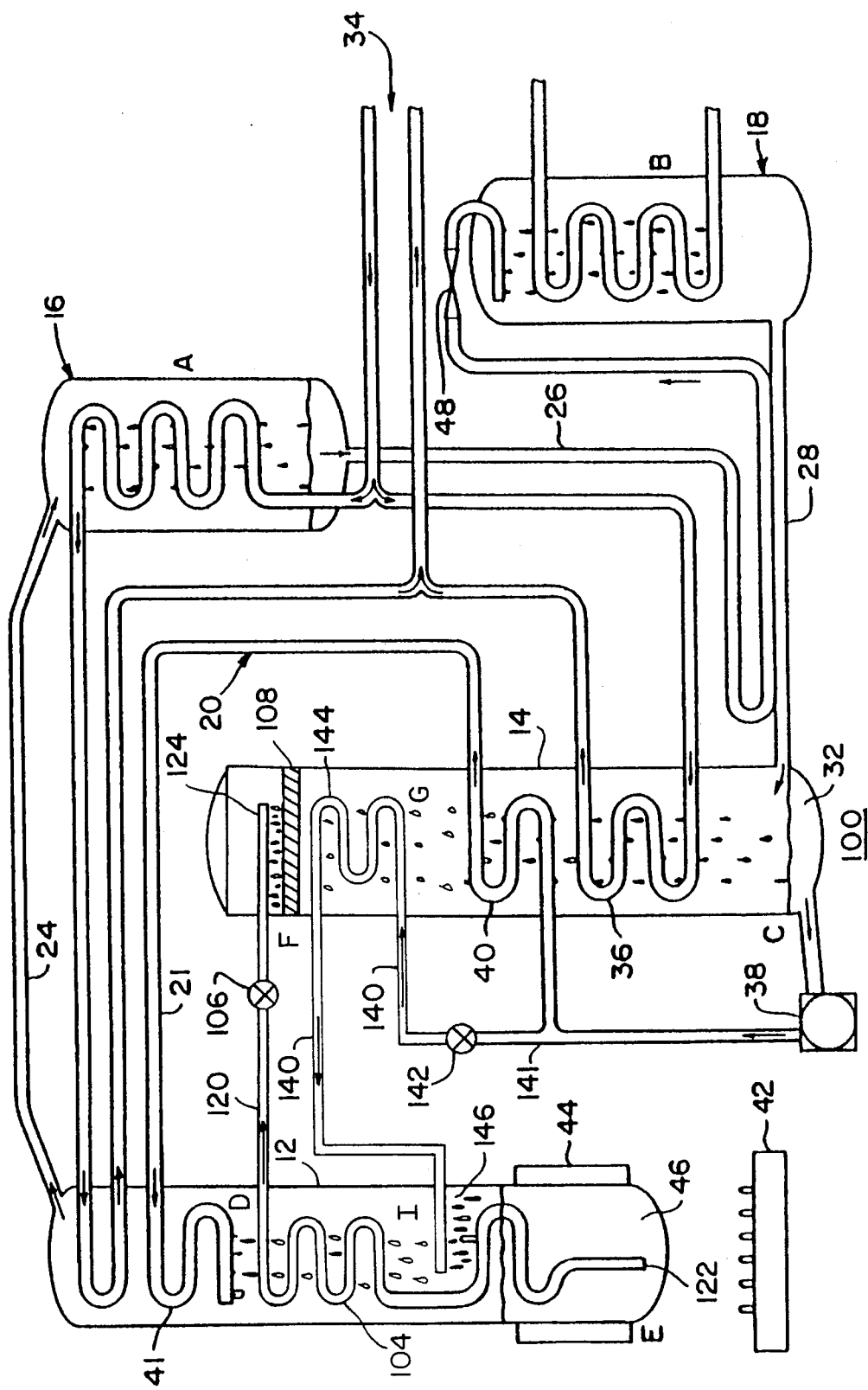
FIG. 3 is a flow diagram of a first embodiment of the GAX apparatus of the present invention.

In FIG. 3, a generator-absorber heat exchange apparatus 100 using the sensible and latent GAX heat transfer method according to the present invention is illustrated. In this embodiment, the heat exchange circuit can also serve as the weak liquor pathway and comprises a heat exchange element 104 located in the heat transfer region of generator 12. A weak liquor heat exchange conduit 120 is provided that includes an input end 122 disposed to withdraw weak liquor 46 from the lower end E of the generator 12, a control valve 106, and a distributor 124 located in the upper end of absorber 14 disposed to distribute the weak liquor in the absorber. Absorber 14 is further provided with an adiabatic section 108 at its upper end.

In the embodiment of the present invention illustrated in FIG. 3, the heat exchange circuit further comprises a heat exchange element 144 located in the heat transfer region of absorber 14. A rich liquor heat exchange conduit 140 is provided that includes an input end 141 disposed to receive rich liquor from rich liquor pathway 20 downstream of rich liquor pump 38, a control valve 142, and a distributor 146 disposed to distribute rich liquor in generator 12.

In accordance with this first embodiment, weak liquor 46 is withdrawn from input end 122 at high temperature region E of generator 12 and is conducted in weak liquor heat exchange conduit 120 to generator heat exchange element 104. As the relatively hot liquor travels through the generator heat exchange element, sensible heat is transferred from it to generator 12, providing a fraction of the total GAX heat transfer. The cooled weak liquor is then transported by conduit 120 through control valve 106 to distributor 124 at the upper end of absorber 14. Adiabatic section 108 in absorber 14 raises the temperature of the weak liquor by partial absorption before it contacts heat exchanger 144. The motive force for transporting weak liquor 46 from generator 12 to absorber 14 through weak liquor heat exchange conduit 120 is generally provided by the pressure differential between generator 12 and absorber 14, but a pump included in weak liquor heat exchange conduit 120 may also be used.

Further, in accordance with the first embodiment of the present invention, a portion of rich liquor 32 is withdrawn from rich liquor pathway 20 at input end 141 and is conducted in rich liquor heat exchange conduit 140 through control valve 142 to absorber heat exchange element 144. As the relatively cool rich liquor travels through the absorber heat exchange element, heat of absorption is transferred from the absorber to the liquor, partially vaporizing the rich liquor and providing the remaining GAX heat transfer. The heated, two-phase rich liquor is then transported by conduit 140 to and through distributor 146 into generator 12.

Figure 4:
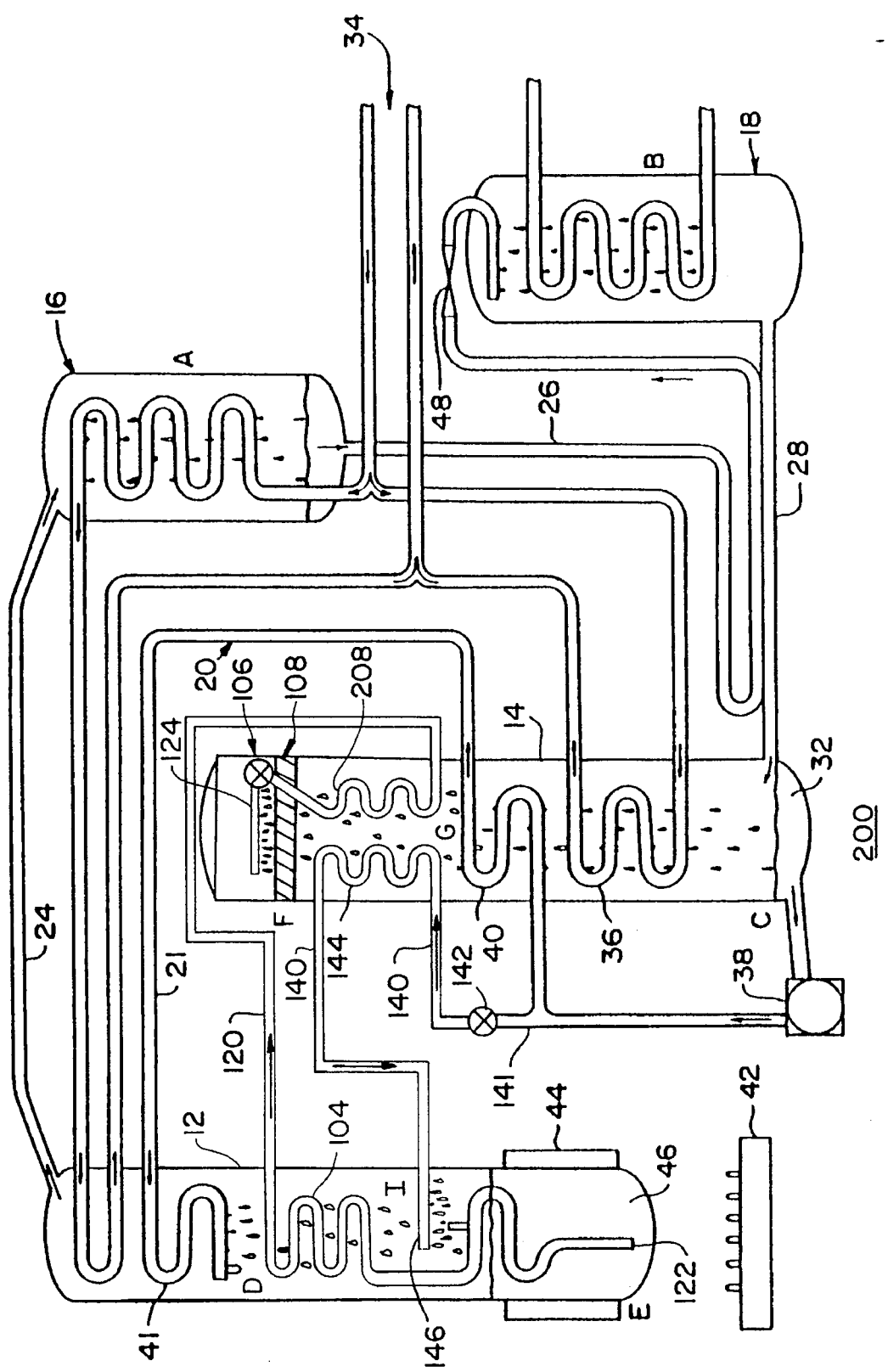
FIG. 4 is a flow diagram of a second embodiment of the GAX apparatus of the present invention.

In FIG. 4, a second generator-absorber heat exchange apparatus 200 using the sensible and latent GAX heat transfer method according to the present invention is illustrated. This second embodiment differs from the first embodiment illustrated in FIG. 3 in that in accordance with this second embodiment, weak liquor 46 is withdrawn from input end 122 at high temperature region E of generator 12 and is conducted in weak liquor heat exchange conduit 120 to generator heat exchange element 104, where sensible heat is transferred from the weak liquor to generator 12, providing a fraction of the total GAX heat transfer. The cooled weak liquor is then transported by conduit 120 to a second heat exchange element 208 in the absorber, where sensible heat is transferred to the weak liquor from the absorber to maximize the weak liquor temperature before absorption. From heat exchange element 208, the weak liquor passes through control valve 106 to distributor 124 at the upper end of absorber 14. Absorber 14 further may be provided with an adiabatic section 108 at its upper end. The remaining GAX heat transfer is accomplished by absorption heat transferred by absorber heat exchange element 144 from the absorber 14 to a portion of rich liquor 32 withdrawn from rich liquor pathway 22 and conducted, via conduit 140 to generator 12.

Figure 5:
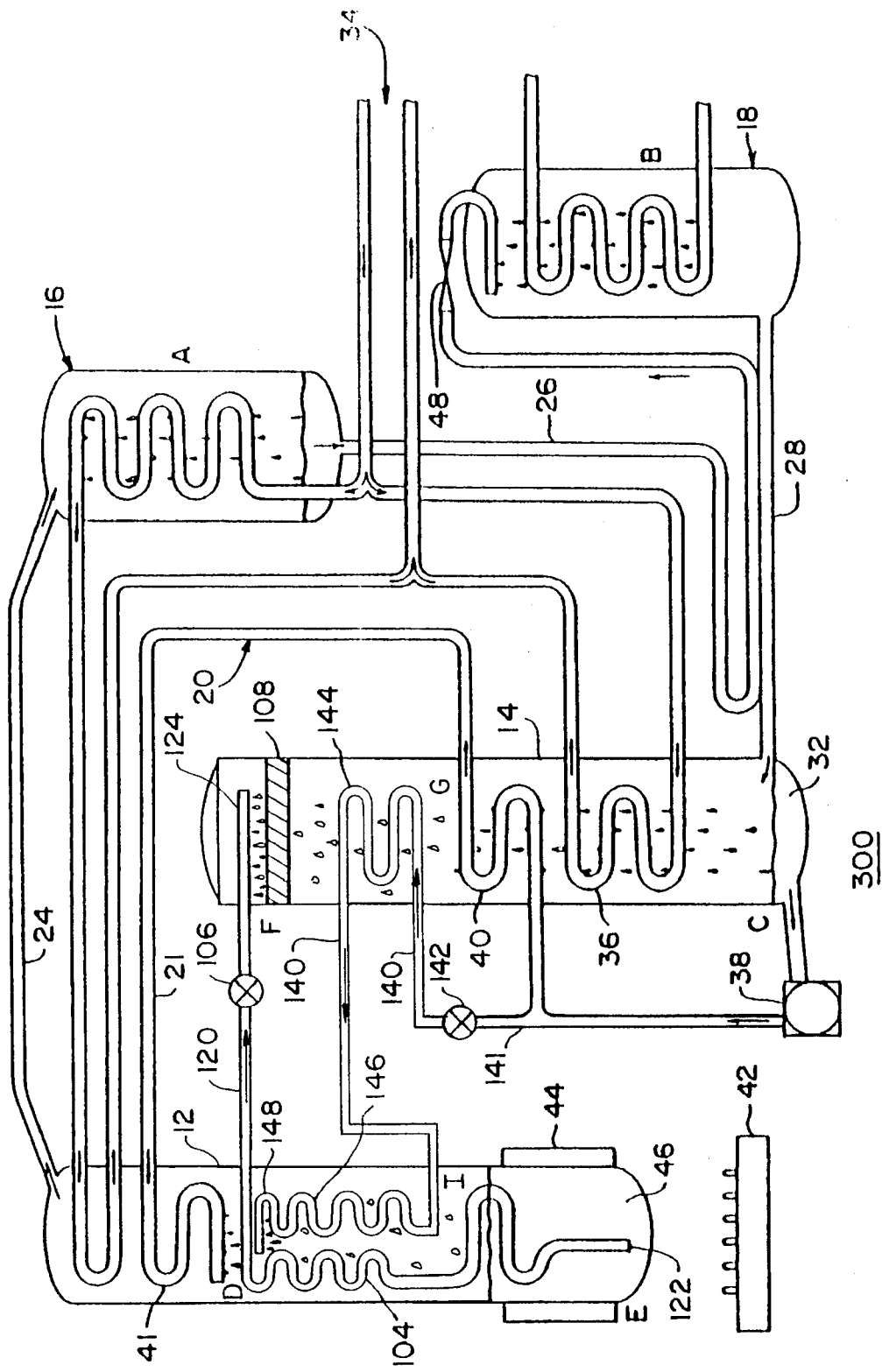
FIG. 5 is a flow diagram of a third embodiment of the GAX apparatus of the present invention.

In FIG. 5, a third generator-absorber heat exchange apparatus 300 using the sensible and latent GAX heat transfer method according to the present invention is illustrated. This third embodiment differs from the first embodiment illustrated in FIG. 3 in that in accordance with this third embodiment, the portion of rich liquor 32 is conducted from absorber heat exchange element 144 by rich liquor heat exchange conduit 140 to a second generator heat exchange element 146 disposed in the heat exchange region of generator 12. The portion of rich liquor 32 flows upwardly through heat exchange element 146, where the portion of rich liquor 32 is cooled, and the rich liquor vapor reabsorbs in the rich liquor liquid, transferring the heat of absorption to the generator 12. The reabsorption of the rich liquor vapor may be made complete or partial as desired for performance or cost requirements. The portion of rich liquor 32 is then conducted from second generator heat exchange element 146 by conduit 140 through distributor 148 into generator 12.

Figure 6:
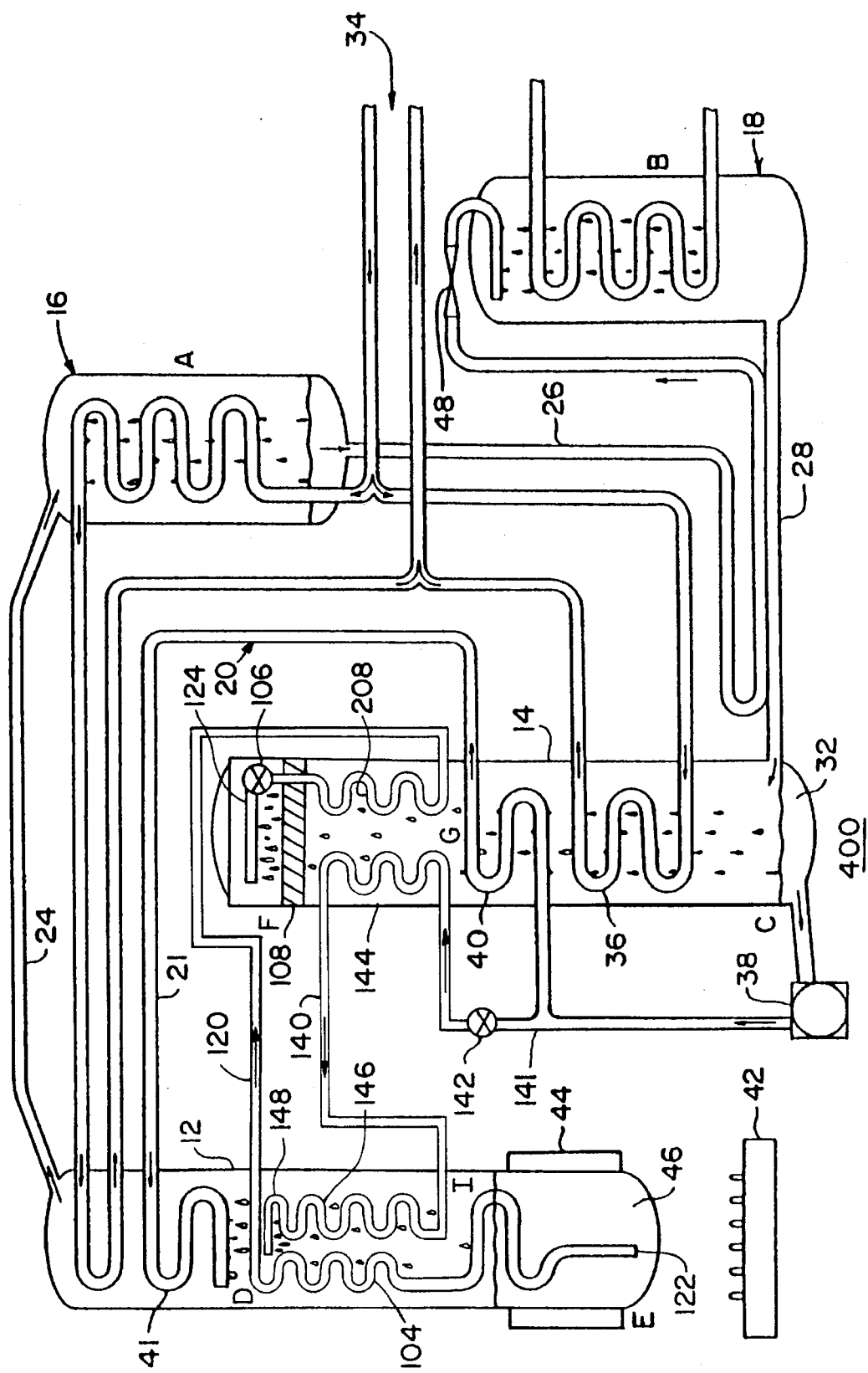
FIG. 6 is a flow diagram of a fourth embodiment of the GAX apparatus of the present invention.

In FIG. 6, a fourth generator-absorber heat exchange apparatus 400 using the sensible and latent GAX heat transfer method according to the present invention is illustrated. This fourth embodiment differs from the first embodiment illustrated in FIG. 3 in that this fourth embodiment incorporates the additional heat exchange circuit features of the second and third embodiments illustrated in FIG. 4 and FIG. 5, respectively.

Thus, in this fourth embodiment, the cooled weak liquor 46 leaving generator heat exchange element 104 is transported by conduit 120 to a second absorber heat exchange element 208, where sensible heat is transferred to the weak liquor from the absorber. From heat exchange element 208 the weak liquor passes through control valve 106 to distributor 124 at the upper end of absorber 14, which is optionally provided with adiabatic section 108 at its upper end.

Further in accordance with this fourth embodiment, the portion of rich liquor 32 is conducted from absorber heat exchange element 144 by rich liquor heat exchange conduit 140 to a second generator heat exchange element 146 disposed in the heat exchange region of generator 12. The portion of rich liquor 32 flows upwardly through heat exchange element 146, where the portion of rich liquor 32 is cooled, and the rich liquor vapor reabsorbs in the rich liquor liquid, transferring the heat of absorption to the generator 12. The reabsorption of the rich liquor vapor may be made complete or partial as desired for performance or cost requirements. The portion of rich liquor 32 is then conducted from second generator heat exchange element 146 by conduit 140 through distributor 148 into generator 12.

An advantage of the present invention is that it reduces the number of heat transfer loops necessary for GAX heat transfer compared to the case where only sensible heat transfer is used. Thus, the present invention permits a simpler apparatus with corresponding savings in construction labor, materials, and maintenance.

Another advantage is that control requirements are simplified over the full operating range of a heat pump incorporating the features of the present invention. At low outdoor temperatures, i.e. less than about 10° F., the GAX heat exchange circuit can no longer provide useful heat and must be shut down. In this non-GAX mode, the sensible heat exchange element 104 can remain in service to maintain maximum efficiency and minimize the number of controls required to switch between GAX and non-GAX modes.

Another advantage of the present invention is that heat pump operation over a range of ambient operating conditions may be optimized by adjusting the portions of GAX heat to be transferred by the weak liquor 46 and the portion of rich liquor 32 to meet any desired performance or cost requirements.

Figure 7:
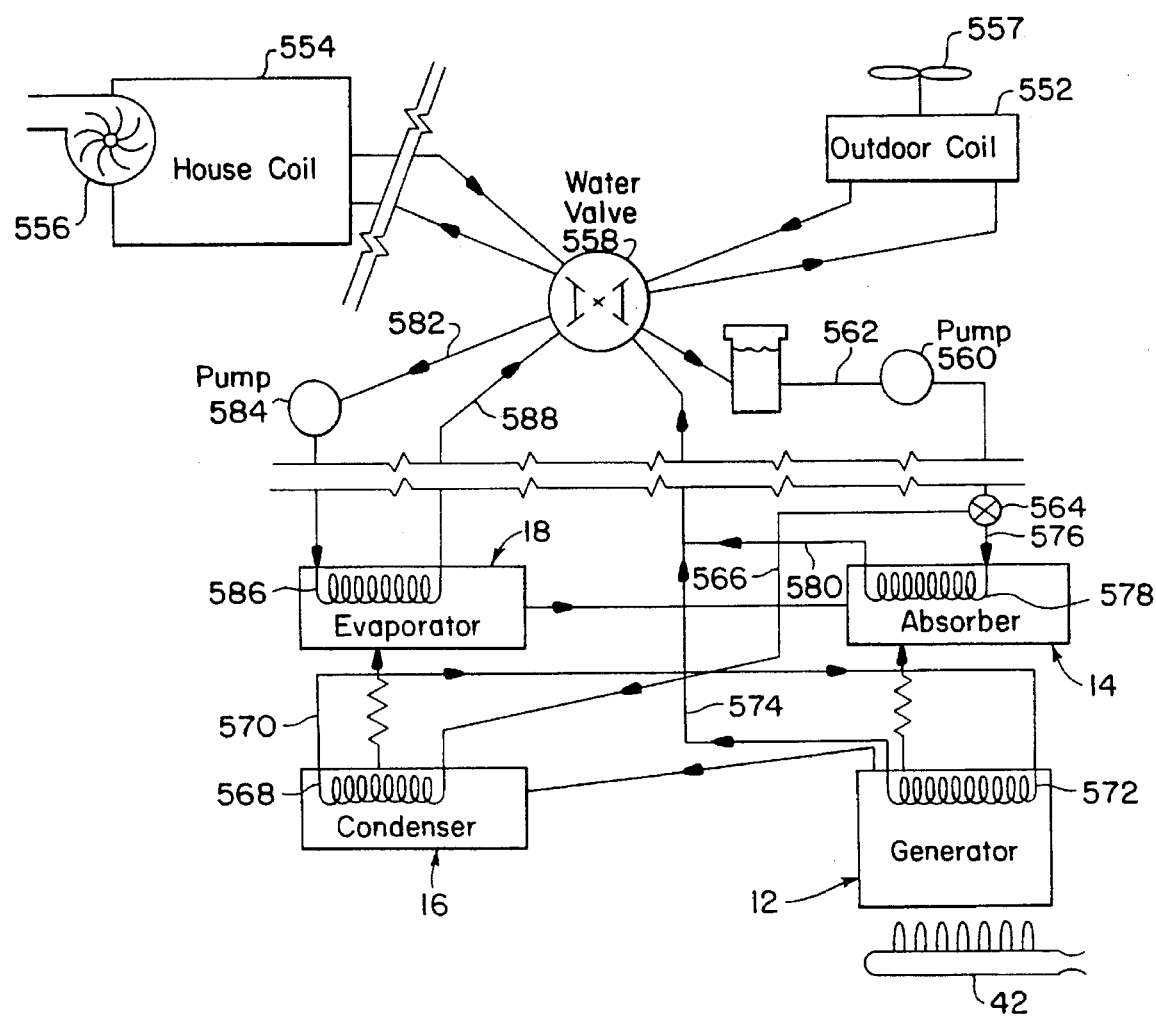
FIG. 7 is a flow diagram of the heat pump of the present invention using the GAX apparatus of the invention.

Referring to FIG. 7, a heat pump 550 is provided which uses one of the generator-absorber heat exchange methods and apparatuses of the invention. The heat pump 550 includes an outdoor heat exchange coil 552 and an indoor heat exchange coil 554. Indoor heat exchange coil 554 may optionally include an air transport apparatus 556, such as a fan or blower for supplying heated or cooled air into a building. Outdoor heat exchange coil 552 may also optionally include an air transport apparatus 557, such as a fan or blower. Outdoor and indoor heat exchange coils 552 and 554, and air transport apparatuses 556 and 557, can be any of the standard, known equipment used in heat pump or air conditioning systems.

Heat pump 550 is comprised of two major sections, the generator-absorber heat exchange apparatus (absorption unit) and the antifreeze fluid system. The generator absorber heat exchange apparatus in accordance with the invention can be made up of the components discussed earlier herein, including an absorber 14, generator 12, condenser 16, solution pump 38, and evaporator 18. The antifreeze fluid system is divided into a cold fluid circuit and a hot fluid circuit. The antifreeze fluids that can be used in accordance with the invention include those fluids known to be useful in transferring heat. A preferred antifreeze fluid is a water solution including an antifreeze liquid that is non-toxic and non-flammable, such as, for example, propylene glycol.

Contrary to standard heat pump systems that reverse the refrigeration circuit to change from cooling to heating, heat pump 550 of the invention, rather than reversing the refrigeration circuit, uses a system flow control apparatus 558, which is preferably an eight-way valve, that is capable of reversing the antifreeze circuits. System flow control apparatus 558 makes it possible to direct the antifreeze fluids from either the cold evaporator 18 or the hot condenser 16, absorber 14 and generator 12 either to the outdoor heat exchange coil 552 or to the indoor heat exchange coil 554.

The cold antifreeze circuit comprises evaporator 18, which chills the antifreeze fluid via evaporator heat exchange coil 586, extracting from the antifreeze fluid the heat removed from the house or building in the summer or from the outdoor air in winter.

The hot antifreeze circuit comprises absorber 14, condenser 16 and generator 12, which raise the temperature of the extracted heat to well above 100° F. The sum of the heat outputs of absorber 14, condenser 16 and generator 12 is equal to the sum of the two heat input quantities, one from the gas flame and the other being the low temperature heat input to evaporator 18. Absorber 14, generator 12 and condenser 16 transfer the system output heat to the hot antifreeze fluid via absorber heat exchange coil 578, generator heat exchange coil 572 and condenser heat exchange coil 568. In the winter, the hot antifreeze fluid transfers much more heat to the house or building than that from the gas flame. In many areas of the United States, supplemental heat should not be required.

In one specific embodiment of the heat pump of the invention, illustrated in FIG. 7, the hot antifreeze circuit includes a first conduit 562 which transports the antifreeze fluid from system flow control apparatus 558 to a first flow control device 564, which can be, for instance, a flow splitter. A fluid transport apparatus 560, such as a pump, is used to circulate the antifreeze fluid through the hot antifreeze circuit. Fluid transport apparatus 560 can be located anywhere in the hot antifreeze circuit, but is preferably located in first conduit 562.

In accordance with this embodiment, a first portion of the antifreeze fluid from first conduit 562 is directed via first flow control device 564 to a second conduit 566, which transports the antifreeze fluid to condenser heat exchange coil 568. In condenser heat exchange coil 568, heat is transferred from condenser 16 to the antifreeze fluid. The antifreeze fluid is transported from condenser heat exchange coil 568 to generator reflux heat exchange coil 572 via third conduit 570. In generator reflux heat exchange coil 572, heat is transferred from generator 12 to the antifreeze fluid. The antifreeze fluid is transported from generator reflux heat exchange coil 572 back to system flow control apparatus 558 via fourth conduit 574.

A second portion of the antifreeze fluid in this embodiment from first conduit 562 is directed via first flow control device 564 to a fifth conduit 576, which transports the antifreeze fluid to absorber heat exchange coil 578. In absorber heat exchange coil 578, heat is transferred from absorber 14 to the antifreeze fluid. The antifreeze fluid is transported from absorber heat exchange coil 578 via sixth conduit 580 into fourth conduit 574 and back to system flow control apparatus 558.

The particular flow arrangement for the hot antifreeze circuit illustrated by FIG. 7 is meant to be illustrative only and should not limit the invention. Other flow arrangements for the antifreeze fluid between absorber 14, condenser 16 and generator 12 are within the scope of the invention. For example, the flow of antifreeze fluid through absorber 14, condenser 16 and generator 12 may be in parallel or in series. However, it is preferred that the flow through condenser 16 and absorber 14 be in parallel, as shown in FIG. 7.

The cold antifreeze circuit includes a first conduit 582 which circulates antifreeze fluid from system flow control apparatus 558 to evaporator heat exchange coil 586. In evaporator heat exchange coil 586, heat is transferred from the antifreeze fluid to evaporator 18. The antifreeze fluid is transported from evaporator heat exchange coil 586 back to system flow control apparatus 558 via second conduit 588. A fluid transport apparatus 584, such as a pump, is used to circulate the antifreeze fluid through the cold antifreeze circuit. Fluid transport 584 can be located elsewhere in the cold antifreeze circuit, but is preferably located in first conduit 582. The particular flow arrangement for the cold antifreeze circuit illustrated by FIG. 7 is meant to be illustrative only and should not limit the scope of the invention.

System flow control apparatus 558 directs the cold antifreeze to indoor heat exchange coil 554 in summer and to outdoor heat exchange coil 552 in winter, at the same time directing the hot antifreeze to outdoor heat exchange coil 552 in summer and to indoor heat exchange coil 554 in winter. This method of reversing the flows to meet the household or building needs for heating or cooling also can also be used during the winter to defrost outdoor heat exchange coil 552, when desired, by reversing the flow to direct hot antifreeze to outdoor heat exchange coil 552.

The choice of materials of construction for all the embodiments described herein and variations thereof depends upon the components of the working fluid, i.e., the refrigerant and absorbent, and the expected operating pressure and temperature ranges. For an ammonia and water absorption solution operating up to about 400° F. and pressures up to near 400 psia, mild steel is the preferred choice of material for all components contacting the solution. The choice of materials of construction for other absorption fluids should be known to those skilled in the art of absorption systems. Similarly, the choice of materials for the antifreeze circuits is well known.

While the various GAX heat transfer means described herein have been illustrated in a residential or light commercial heat pump, their benefits are not limited to such applications. The enhanced performance provided by the various GAX heat transfer schemes set forth herein may be applied to processes requiring medium temperature heating and cooling such as brewing, food processing, pasteurizing and paper making, to mention but a few examples. Furthermore, the principles of the invention are not limited to absorption heat pump cycles that efficiently convert heat from a combination of low and high temperature heat sources to heat at a medium temperature. The invention is equally applicable to heat transformers which convert heat from a medium-high temperature, such as hot waste water discharged from a processing plant, to produce a useful high temperature output plus a lower temperature output.

It will be apparent to those skilled in the art that various modifications and variations can be made in the generator-absorber heat exchange apparatus, heat pump and method of transferring heat between the generator and absorber without departing from the spirit or scope of the invention. Thus, it is intended that the present invention cover the modifications and variations of this invention provided that they come within the scope of the appended claims and their equivalents.

What is claimed is:

1. In a generator-absorber heat exchange apparatus including a generator and an absorber, the absorber having an interior pressure lower than the interior pressure of the generator, the generator and absorber having high and low temperature regions establishing respective temperature ranges, the temperature ranges overlapping and thereby defining respective heat transfer regions in the generator and absorber, the generator-absorber heat exchange apparatus further having a fluid flow pathway circulating a weak liquor from the high temperature of the generator and a rich liquor from the low temperature region of the absorber to and through the high temperature, heat transfer, and low temperature regions of the generator and the absorber, the improvement comprising:

a heat exchange circuit receiving at least a portion of weak liquor from the generator and receiving a portion of rich liquor from the absorber, the heat exchange circuit including a generator heat exchange element disposed in the generator heat transfer region and an absorber heat exchange element disposed in the absorber heat transfer region for circulating said portions of weak and rich liquor between the heat transfer regions, thereby transferring heat from the absorber to the generator.

2. A generator-absorber heat exchange apparatus according to claim 1, wherein the heat exchange circuit further comprises:

a weak liquor heat exchange conduit in fluid communication with the fluid flow pathway, having an input end for receiving weak liquor from the fluid flow pathway and an output end for distributing the weak liquor within the absorber, said weak liquor heat exchange conduit conducting weak liquor from the fluid flow pathway through the generator heat exchange element to the absorber interior;

a rich liquor heat exchange conduit in fluid communication with the fluid flow pathway, having an input end for receiving rich liquor from the fluid flow pathway and an output end for distributing the rich liquor within the generator, said rich liquor heat exchange conduit conducting rich liquor from the fluid flow pathway through the absorber heat exchange element to the generator interior; and means for providing motive force for circulating liquor in the heat exchange circuit.

3. A generator-absorber heat exchange apparatus according to claim 2, wherein the heat exchange circuit further comprises:
a second absorber heat exchange element in the weak liquor heat exchange conduit disposed in the absorber heat transfer region, said weak liquor heat exchange conduit conducting weak liquor from the fluid flow pathway through the generator heat exchange element and the second absorber heat exchange element to the absorber interior.

4. A generator-absorber heat exchange apparatus according to claim 2, wherein the heat exchange circuit further comprises:
a second generator heat exchange element in the rich liquor heat exchange conduit disposed in the generator heat transfer region, said rich liquor heat exchange conduit conducting rich liquor from the fluid flow pathway through the absorber heat exchange element and the second generator heat exchange element to the generator interior.

5. A generator-absorber heat exchange apparatus according to claim 2, wherein the heat exchange circuit further comprises:
a second absorber heat exchange element in the weak liquor heat exchange conduit disposed in the absorber heat transfer region and a second generator heat exchange element in the rich liquor heat exchange conduit disposed in the generator heat transfer region, said weak liquor heat exchange conduit conducting weak liquor from the fluid flow pathway through the generator heat exchange element and the second absorber heat exchange element to the absorber interior, and said rich liquor heat exchange conduit conducting rich liquor from the fluid flow pathway through the absorber heat exchange element and the second generator heat exchange element to the generator interior.

6. The apparatus of claim 2, wherein the means for providing motive force for circulating rich liquor through the heat exchange circuit is a pump.

7. The apparatus of claim 2, wherein the means for providing motive force for circulating weak liquor through the heat exchange circuit is the pressure differential between the generator and the absorber.

8. The apparatus of claim 2, wherein the weak liquor heat exchange conduit further comprises a flow control means upstream of the weak liquor output end.

9. The apparatus of claim 2, wherein the rich liquor heat exchange conduit further comprises a flow control means upstream of the rich liquor output end.

10. The apparatus of claim 2, wherein the rich liquor input end is in fluid communication with the fluid flow pathway at a location where the liquor is a rich liquor liquid.

11. The apparatus of claim 2, wherein the weak liquor input end is in fluid communication with the fluid flow pathway at a location where the weak liquor is a weak liquor liquid.

12. The apparatus of claim 2, wherein the weak liquor conducted from the fluid flow pathway to the absorber interior is substantially in the liquid state in at least a portion of the heat exchange circuit.

13. The apparatus of claim 2, wherein the rich liquor conducted from the fluid flow pathway to the generator interior is substantially in a two-phase liquid/vapor state in at least a portion of the heat exchange circuit.

14. A generator-absorber heat exchange apparatus comprising:

a generator containing a liquor having a concentration gradient extending from rich proximate an upper end of the generator to weak proximate a lower end of the generator and a temperature gradient extending from low proximate the upper end of the generator to high proximate the lower end of the generator;

a heater for heating liquor in the generator proximate the lower end thereof;

an absorber having a pressure in its interior lower than the interior pressure of the generator containing a liquor having a concentration gradient extending from weak proximate an upper end of the absorber to rich proximate a lower end of the absorber and a temperature gradient extending from high proximate the upper end of the absorber to low proximate the lower end of the absorber;

an overlap of the generator and absorber temperature gradients defining within the generator and absorber respective heat transfer regions;

a weak liquor heat exchange conduit having an inlet in fluid communication with the generator proximate its lower end, a heat exchange element disposed in the generator heat transfer region, and an outlet in fluid communication with the absorber proximate its upper end, said weak liquor heat exchange conduit receiving through the inlet at least a portion of the weak liquor from the generator, conducting the weak liquor through the heat exchange element disposed in the generator heat transfer region, and distributing the weak liquor in the absorber through the outlet for passage along the concentration and temperature gradients of the absorber; and a rich liquor heat exchange conduit having an inlet in fluid communication with the absorber proximate its lower end, a heat exchange element disposed in the absorber heat transfer region, and an outlet in fluid communication with the generator proximate its heat transfer region, said rich liquor heat exchange conduit receiving through the inlet a portion of the rich liquor from the absorber, conducting the rich liquor through the heat exchange element disposed in the absorber heat transfer region, and distributing the rich liquor in the generator through the outlet for passage along the concentration and temperature gradients of the generator; and a pump in fluid communication with the rich liquor heat exchange conduit pumping rich liquor from the absorber through the rich liquor heat exchange conduit to the generator.

15. The apparatus of claim 14, wherein the weak liquor heat exchange conduit further comprises a second heat exchange element disposed in the heat transfer region of the absorber, said weak liquor heat exchange conduit receiving at least a portion of the weak liquor from the generator, conducting the weak liquor through the heat exchange element disposed in the generator heat transfer region and through the second heat exchange element disposed in the absorber heat transfer region, and distributing the weak liquor in the absorber through the outlet for passage along the concentration and temperature gradients of the absorber.

16. The apparatus of claim 14, wherein the rich liquor heat exchange conduit further comprises a second heat exchange element disposed in the heat transfer region of the generator, said rich liquor heat exchange conduit receiving a portion of the rich liquor, conducting the rich liquor through the heat exchange element disposed in the absorber heat transfer region and through the second heat exchange element disposed in the generator heat transfer region, and distributing the rich liquor in the generator through the outlet for passage along the concentration and temperature gradients of the generator.

17. The apparatus of claim 14, wherein the weak liquor heat exchange conduit further comprises a second heat exchange element disposed in the heat transfer region of the absorber, said weak liquor heat exchange conduit receiving at least a portion of the weak liquor from the generator, conducting the weak liquor through the heat exchange element disposed in the generator heat transfer region and through the second heat exchange element disposed in the absorber heat transfer region, and distributing the weak liquor in the absorber through the outlet for passage along the concentration and temperature gradients of the absorber; and wherein the rich liquor heat exchange conduit further comprises a second heat exchange element disposed in the heat transfer region of the generator, said rich liquor heat exchange conduit receiving a portion of the rich liquor, conducting the rich liquor through the heat exchange element disposed in the absorber heat transfer region and through the second heat exchange element disposed in the generator heat transfer region, and distributing the rich liquor in the generator through the outlet for passage along the concentration and temperature gradients of the generator.

18. The apparatus of claim 14, wherein a pump provides motive force for conducting the weak liquor from the generator through the weak liquor heat exchange conduit to the absorber.

19. The apparatus of claim 14, wherein the pressure differential between the generator and absorber provides motive force for conducting the weak liquor from the generator through the weak liquor heat exchange conduit to the absorber.

20. The apparatus of claim 14, wherein the weak liquor heat exchange conduit further comprises a control valve upstream of the weak liquor heat exchange conduit outlet.

21. The apparatus of claim 14, wherein the rich liquor heat exchange conduit further comprises a control valve upstream of the rich liquor heat exchange conduit outlet.

22. The apparatus of claim 14, wherein the weak liquor conducted from the generator to the absorber through the weak liquor heat exchange conduit is substantially in the liquid state.

23. The apparatus of claim 14, wherein the rich liquor conducted from the absorber to the generator through the rich liquor heat exchange conduit is a two-phase mixture of liquid and vapor in at least a portion of the heat exchange circuit.

24. A heat pump comprising:
an indoor liquid-air heat exchanger;
an outdoor liquid-air heat exchanger; and
a generator-absorber heat exchange apparatus comprising:
a generator and an absorber, the absorber having an interior pressure lower than the interior pressure of the generator and each having high and low temperature regions at opposite ends establishing respective temperature ranges, the temperature ranges defining respective overlapping heat transfer regions;
a fluid flow pathway circulating a weak liquor from the high temperature region of the generator and a rich liquor from the low temperature region of the absorber to and through the high temperature, heat transfer, and low temperature regions of the generator and absorber;
a heat exchange circuit receiving at least a portion of weak liquor from the generator and also receiving a portion of rich liquor from the absorber, the heat exchange circuit circulating the portions of weak and rich liquor between the heat transfer regions, thereby transferring heat from the absorber to the generator; and
an antifreeze circuit disposed to circulate antifreeze fluid between each of the indoor and outdoor heat exchanger apparatus for selectively extracting heat from one of the exchangers and transferring heat to the other of the heat exchangers.

25. The heat pump of claim 24, wherein the heat exchange circuit further comprises:
a generator heat exchange element disposed in the generator heat transfer region;
a weak liquor heat exchange conduit in fluid communication with the fluid flow pathway, having an input end for receiving weak liquor from the fluid flow pathway and an output end for distributing the weak liquor within the absorber, said weak liquor heat exchange conduit conducting weak liquor from the fluid flow pathway through the generator heat exchange element and then to the absorber interior;
an absorber heat exchange element disposed in the absorber heat transfer region;
a rich liquor heat exchange conduit in fluid communication with the fluid flow pathway, having an input end for receiving rich liquor from the fluid flow pathway and an output end for distributing the rich liquor within the generator, said rich liquor heat exchange conduit conducting rich liquor from the fluid flow pathway through the absorber heat exchange element and then to the generator interior; and
a means for providing motive force for circulating liquor in the heat exchange circuit.

26. The heat pump of claim 25, wherein the heat exchange circuit further comprises:
a second absorber heat exchange element in the weak liquor heat exchange conduit disposed in the absorber heat transfer region, said weak liquor heat exchange conduit conducting weak liquor from the fluid flow pathway through the generator heat exchange element and through the second absorber heat exchange element to the absorber interior.

27. The heat pump of claim 25, wherein the heat exchange circuit further comprises:
a second generator heat exchange element disposed in the generator heat transfer region, said rich liquor heat exchange conduit conducting rich liquor from the fluid flow pathway through the absorber heat exchange element and through the second generator heat exchange element to the generator interior.

28. The heat pump of claim 24, wherein the heat exchange circuit further comprises:
a second heat exchange element disposed in the absorber heat transfer region and a second heat exchange element disposed in the generator heat transfer region, said weak liquor heat exchange conduit conducting weak liquor from the fluid flow pathway through the generator heat exchange element and through the second absorber heat exchange element to the absorber interior, and said rich liquor heat exchange conduit conducting rich liquor from the fluid flow pathway through the absorber heat exchange element and through the second generator heat exchange element to the generator interior.

29. A method for transferring heat between an absorber and a generator in a generator-absorber heat exchange apparatus including a generator and an absorber, the absorber having an interior pressure lower than the pressure of the generator interior, and each having high and low temperature regions at opposite ends defining respective temperature ranges, the temperature ranges defining respective overlapping heat transfer regions, and a fluid flow pathway for circulating of a weak liquor from the high temperature region of the generator and a rich liquor from the low temperature region of the absorber through the high temperature, heat transfer, and low temperature regions of the generator and the absorber, the method comprising:

circulating, in a heat exchange circuit, at least a portion of the weak liquor through a generator heat exchange element in the generator heat transfer region and a portion of the rich liquor through an absorber heat exchange element in the absorber heat transfer region, thereby transferring heat from the absorber to the generator.

30. The method of claim 29, further comprising conducting the weak liquor in a heat exchange circuit receiving the weak liquor from the fluid flow pathway through an input end, through the generator heat exchange element to the absorber interior through an output end, and further comprising conducting the portion of rich liquor in the heat exchange circuit receiving the rich liquor from the fluid flow pathway through an input end, through the absorber heat exchange element to the generator interior through an output end.

31. The method of claim 30, further comprising conducting the weak liquor in the heat exchange circuit from the heat exchange element disposed in the generator heat transfer region through a second heat exchange element disposed in the absorber heat transfer region to the absorber interior through the output end.

32. The method of claim 30, further comprising conducting the portion of rich liquor in the heat exchange circuit from the heat exchange element disposed in the absorber heat transfer region through a second heat exchange element disposed in the generator heat transfer region to the generator interior through the output end.

33. The method of claim 30, further comprising conducting the weak liquor in the heat exchange circuit from the heat exchange element disposed in the generator heat transfer region through a second heat exchange element disposed in the absorber heat transfer region to the absorber interior through the output end, and further comprising conducting the portion of rich liquor in the heat exchange circuit from the heat exchange element disposed in the absorber heat transfer region through a second heat exchange element disposed in the generator heat transfer region to the generator interior through the output end.

34. The method of claim 33, further comprising:

conducting the weak liquor from an input end proximate the lower end of the generator through a heat exchange element disposed in the heat transfer region of the generator to an output end proximate the upper end of the absorber, such that the temperature of the weak liquor from the low end of the generator is greater than the temperature of the generator heat exchange region, thereby transferring heat from the weak liquor in the heat exchange element to the liquor in the generator; and conducting the portion of rich liquor through an input end in fluid communication with the fluid flow pathway through a heat exchange element disposed in the heat transfer region of the absorber to an output end in the generator, such that the temperature of the portion of rich liquor is less than the temperature of the absorber heat exchange region, thereby transferring heat from the liquor in the absorber to the portion of rich liquor in the heat exchange element.

35. The method of claim 34, further comprising:

conducting the weak liquor leaving the heat exchange element disposed in the heat transfer region of the generator through a second heat exchange element disposed in the heat transfer region of the absorber to an output end proximate the upper end of the absorber, such that the temperature of the weak liquor conducted from the generator heat transfer region is less than the temperature of the absorber heat transfer region thereby transferring heat from the liquor in the absorber to the weak liquor in the second heat exchange element disposed in the absorber heat transfer region.

36. The method of claim 34, further comprising:

conducting the portion of rich liquor leaving the heat exchange element disposed in the heat transfer region of the absorber to a second heat exchange element disposed in the heat transfer region of the generator to an output end in the generator, such that the temperature of the portion of rich liquor conducted from the absorber heat transfer region is greater than the temperature of the generator heat transfer region, thereby transferring heat from the rich liquor in the second heat exchange element disposed in the generator heat transfer region to the liquor in the generator.

37. The method of claim 34, further comprising:

conducting the weak liquor leaving the heat exchange element disposed in the heat transfer region of the generator through a second heat exchange element disposed in the heat transfer region of the absorber to an output end proximate the upper end of the absorber, such that the temperature of the weak liquor conducted from the generator heat transfer region is less than the temperature of the absorber heat transfer region thereby transferring heat from the liquor in the absorber to the weak liquor in the second heat exchange element disposed in the absorber heat transfer region; and conducting the portion of rich liquor leaving the heat exchange element disposed in the heat transfer region of the absorber to a second heat exchange element disposed in the heat transfer region of the generator to an output end in the generator, such that the temperature of the portion of rich liquor conducted from the absorber heat transfer region is greater than the temperature of the generator heat transfer region, thereby transferring heat from the rich liquor in the second heat exchange element disposed in the generator heat transfer region to the liquor in the generator.

38. The method of claim 30, further comprising conducting the weak liquor through the heat exchange circuit with a pump.

39. The method of claim 30, further comprising conducting the weak liquor through the heat exchange circuit, with the pressure differential between the generator and the absorber.

40. The method of claim 30, further comprising conducting the weak liquor through the heat exchange circuit to the absorber interior substantially in the liquid state.

41. The method of claim 30, further comprising conducting the portion of rich liquor through the heat exchange circuit to the generator interior in a two-phase mixture of liquid and vapor in at least a portion of the heat exchange circuit.

42. The method of claim 30, further comprising conducting the portion of rich liquor through the heat exchange circuit with a pump.

43. A method of transferring heat to a region of low temperature from a region of medium temperature using a generator-absorber heat exchange apparatus including a generator and an absorber, the absorber having an interior pressure lower than the pressure of the generator interior and each having high and low temperature regions at opposite ends establishing respective temperature ranges, the temperature ranges defining respective overlapping heat transfer regions, a fluid flow pathway for circulation of a weak liquor from the high temperature region of the generator and a rich liquor from the low temperature region of the absorber through the high temperature, heat transfer and low temperature regions of the generator and the absorber, a heat exchange circuit receiving at least a portion of weak liquor from the generator and also receiving a portion of rich liquor from the absorber, the method comprising:

circulating at least a portion of antifreeze fluid between an indoor heat exchanger and at least one of an absorber heat exchanger, a condenser heat exchanger and a generator heat exchanger, thereby transferring heat via the antifreeze fluid from the at least one absorber, condenser and generator heat exchanger to the indoor heat exchanger;

circulating an antifreeze fluid between an outdoor heat exchanger and an evaporator heat exchanger, thereby transferring heat via the antifreeze fluid from the outdoor heat exchanger to the evaporator heat exchanger; and circulating in the heat exchange circuit the portions of weak and rich liquor between the heat transfer regions of the generator and the absorber, thereby transferring heat from the absorber to the generator.

44. A method of transferring heat to a region of medium temperature from a region of high temperature using a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining respective overlapping heat transfer regions, a fluid flow pathway for circulation of a weak liquor from the high temperature region of the generator and a rich liquor from the low temperature region of the absorber to and through the high temperature, heat transfer and low temperature regions of the generator and the absorber, a heat exchange circuit receiving at least a portion of weak liquor from the generator and also receiving a portion of rich liquor from the absorber, the method comprising:

circulating at least a portion of antifreeze fluid between an outdoor heat exchanger and at least one of an absorber heat exchanger, a condenser heat exchanger and a generator heat exchanger, thereby transferring heat via the antifreeze fluid from the at least one absorber, condenser and generator heat exchanger to the outdoor heat exchanger;

circulating an antifreeze fluid between an indoor heat exchanger and an evaporator heat exchanger, thereby transferring heat via the antifreeze fluid from the indoor heat exchanger to the evaporator heat exchanger; and circulating in the heat exchange circuit the portions of weak and rich liquor between the heat transfer regions of the generator and absorber, thereby transferring heat from the absorber to the generator.

* * * * *